United States Patent

Naylor, Jnr. et al.

[11] Patent Number: 5,832,185
[45] Date of Patent: Nov. 3, 1998

[54] ALTERATION OF DITHER MATRIX SIZE FOR FULL COLOR DITHERING

[75] Inventors: William Clark Naylor, Jnr., Santa Clara, Calif.; Kia Silverbrook, New South Wales, Austria

[73] Assignee: Canon Information System Research Australia Pty Ltd., New South Wales, Austria

[21] Appl. No.: 586,821

[22] PCT Filed: Sep. 1, 1994

[86] PCT No.: PCT/AU94/00514

§ 371 Date: Apr. 26, 1996

§ 102(e) Date: Apr. 26, 1996

[87] PCT Pub. No.: WO95/06910

PCT Pub. Date: Mar. 9, 1995

[30] Foreign Application Priority Data

Sep. 1, 1993 [AU] Australia ................. PM0973

[51] Int. Cl.⁶ .................. G06K 15/00; G06T 5/00; H04N 1/52; H04N 1/58
[52] U.S. Cl. .................. 395/109; 382/270; 382/275; 358/533; 358/535
[58] Field of Search .................. 395/109; 358/533, 358/534, 535, 536, 454, 456, 457, 466; 382/270

[56] References Cited

U.S. PATENT DOCUMENTS

| 4,651,293 | 3/1987 | Kato ................. 364/602 |
| 4,698,778 | 10/1987 | Ito et al. ................. 358/457 |
| 4,809,063 | 2/1989 | Moriguchi et al. ........... 358/535 |

FOREIGN PATENT DOCUMENTS

| 57-159173 | 10/1982 | Japan ................. H04N 1/40 |
| 3-83177 | 4/1991 | Japan ................. H04N 1/40 |
| 3-83178 | 4/1991 | Japan ................. H04N 1/40 |

*Primary Examiner*—Scott Rogers
*Attorney, Agent, or Firm*—Fitzpatrick, Cella, Harper & Scinto

[57] ABSTRACT

Disclosed is a method of producing a multicolored image in which the image is produced through the aggregation of a multiplicity of color dithering passes (CMYK). The method uses a dither matrix for at least one pass (C) which is of a different size relatively prime in relation to dither matrices used for the other passes.

6 Claims, 2 Drawing Sheets

Fig. 1

ALTERATION OF DITHER MATRIX SIZE FOR FULL COLOR DITHERING

The present invention relates to the display of images by use of the halftoning technique of dithering and in particular, relates to the display of images having multiple colour components.

BACKGROUND ART

Digital halftoning for the purpose of generating colour images with multiple levels is a well known art. For an extensive review of the field of halftoning, reference is made to "Digital Halftoning" by R. Ulichney, MIT Press, Cambridge, Mass. The area of halftoning is generally divided into the fields of dithering and error diffusion. The field of dithering is generally divided into the areas of (i) random dither, (ii) clustered dot ordered dither and (iii) dispersed dot dither. Of these, (ii) clustered dot dither and (iii) dispersed dot dither are the most prevalent.

PRIOR ART DRAWINGS

The prior art will now be described with reference to FIGS. 1 and 2 in which:

FIG. 1 illustrates an example of a traditional dithering system; and

FIG. 2 illustrates the process of tiling an image with a dither matrix.

Referring now to FIG. 1, there is shown an example of a traditional dithering system 1. The dithering system relies on the utilization of a dither matrix 2 in conjunction with an image 3 which is desired to be printed out. Each pixel of the image 3 is presented to a comparator 4 along with a corresponding dither matrix value from dither matrix 2. The comparator 4 compares its two inputs and if the pixel value from image 3 is greater than the dither matrix value from dither matrix 2 the comparator outputs a "1" to a printing device 5. Otherwise, a "0" is output to the printing device. The printing device 5 produces an output mark on pixel locations when it receives a "1" from the comparator 4 and it produces no output marks when it receives a "0" from the comparator 4.

The correspondence between a particular pixel value in image 3 and its corresponding dither matrix value in image 2 is normally obtained by means of the lower order address bits of the pixel location in image 2. Those skilled in the art will understand that this is equivalent to utilizing modulo arithmetic on the pixel address of image 3 to derive a corresponding dither matrix element from dither matrix 2.

Referring now to FIG. 2, those skilled in the art will further realize that the use of modulo arithmetic is equivalent to "tiling" the image 3 by multiple copies of the dither matrix 1.

Unfortunately, the process of tiling of an image can lead to unwanted artifacts, detectable by the human eye, especially where an image 3 consists of large areas of slowly varying intensities. The production of artifacts can be somewhat alleviated by utilizing larger dither matrices. However, the use of large dither matrices does not result in total elimination of these artifacts in an image.

Both clustered dot dither and dispersed dot dither are based on the creation of a threshold screen pattern or dither matrix, for example an 8×8 array of dither values. The difference between the two techniques is that in clustered dot dithering the lower threshold values are centred in a cluster pattern whereas in dispersed dot dithering they are scattered in the dispersed pattern. As such, the clustered-dot technique has a central dot that increases in size as the signal level increases and the dispersed-dot technique has small scattered dots that increase in number as the input signal level increases. In both techniques, the number of levels that can be normally represented by the dither matrix is normally equal to the size of the screen pattern, e.g. an 8×8 screen can produce 64 unique levels.

Unfortunately the use of larger dither matrices does not result in the total elimination of artifacts in an image. This is especially the case when a dither matrix is used in the field of colour printing where multiple passes are made using different colour inks to produce a final image. One common form of colour printing is to have subtractive colour printing whereby separate Cyan, Magenta, Yellow and Black passes are utilized in forming an image.

Patterns can often arise from the combination of one or more different coloured inks whereby each primary colour has been produced by using, for example, a clustered dot dither matrix. These patterns are known to those skilled in the art as Moire patterns and Rosettes and result primarily from the setting up of beat frequencies through the interaction of the various dither value arrangements for different screen colours.

Additional patterns due to the repetitive nature of the dithering process, whereby the dither matrix is continuously repeatedly used, can also produce other unwanted artifacts. These patterns can be further reinforced by the multiple pass method used in the colour printing process itself.

OBJECT OF THE INVENTION

It is an object of the present invention to provide a method for reducing unwanted artifacts in at least one class of images.

SUMMARY OF THE INVENTION

In accordance with one aspect of the present invention there is provided a method of producing a multicoloured image, wherein said image is produced through the aggregation of a multiplicity of colour dithering passes, said method comprising using a dither matrix for at least one of said passes which is of a different size from the dither matrix used for each remaining pass.

An image produced in accordance with the above method is also disclosed.

DESCRIPTION OF THE PREFERRED EMBODIMENT

The preferred embodiment of the present invention will now be described with reference to the accompanying, drawings in which:

FIGS. 3 to 6 inclusive which shows the result of alteration in dither matrix sizes for different colour passes.

In the preferred embodiment of the present invention, separate dither matrices are used for each colour. This in itself is not always sufficient to break up patterns as the dither matrices in combination can still produce beat frequencies that will result in visible patterns or artifacts. However, in the preferred embodiment, a different size dither matrix is used for each different colour. In order to minimize the rate with which the combination of portions of different dither matrices will repeat, the widths and heights of the dither matrices of each pass are preferably relatively prime with respect to one another (ie. the widths and heights have no common factors).

Figure 1:
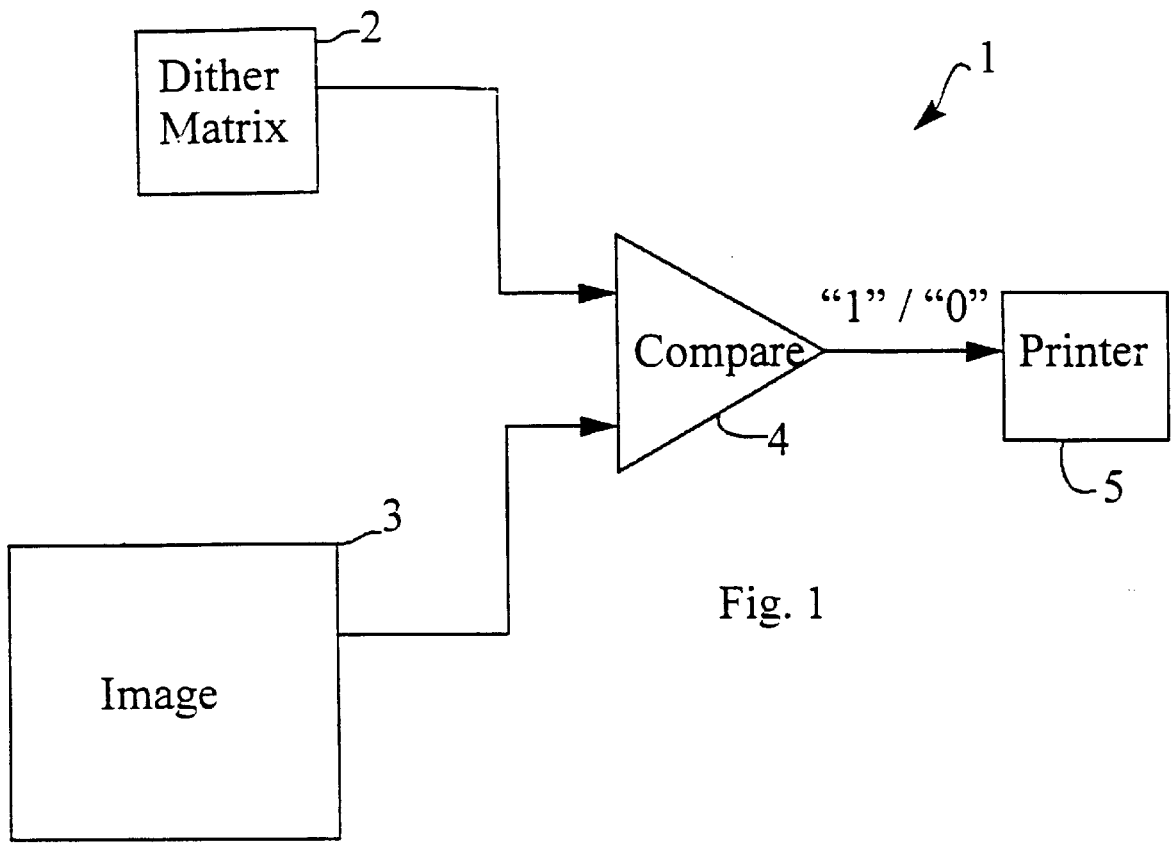
FIG. 1 illustrates an example of a traditional dithering system.
Figure 2:
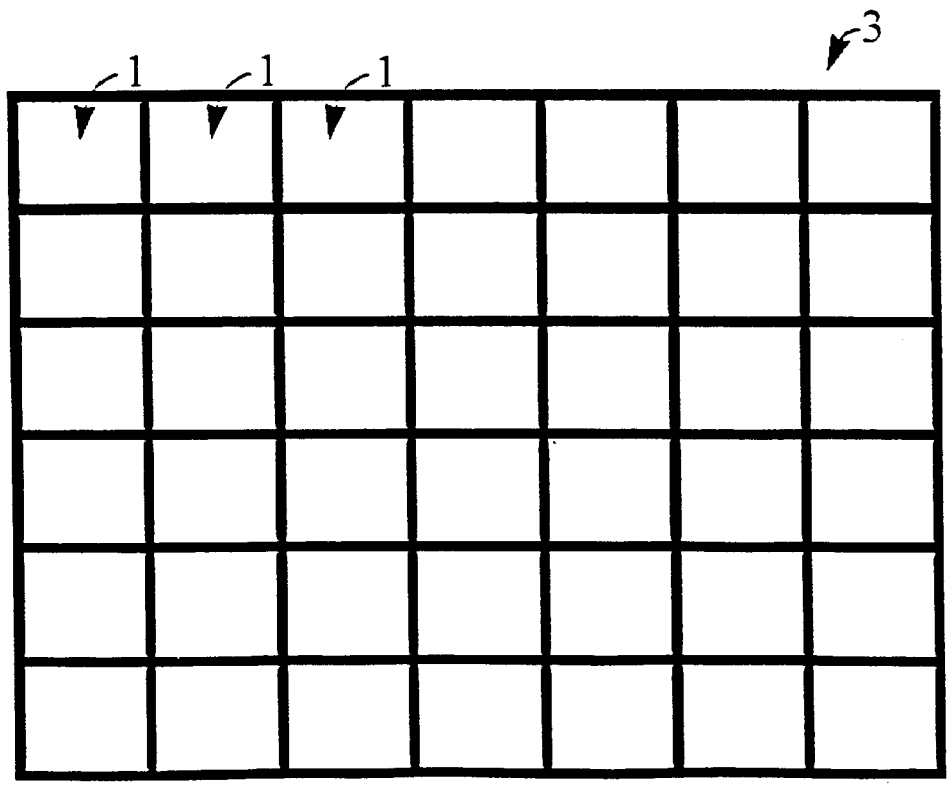
FIG. 2 illustrates the process of tiling an image with a dither matrix.
Figure 3:
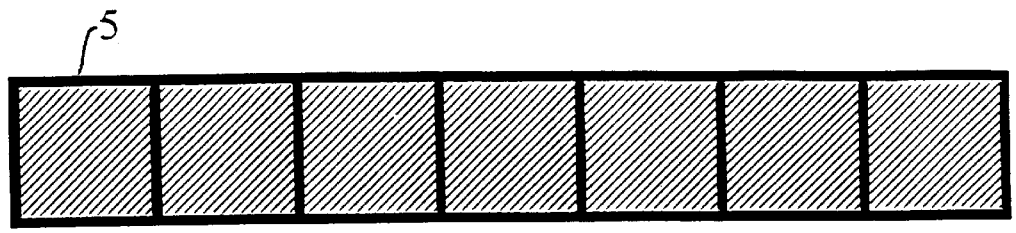
FIGS. 3 to 6 inclusive which shows the result of alteration in dither matrix sizes for different colour passes.
Figure 4:
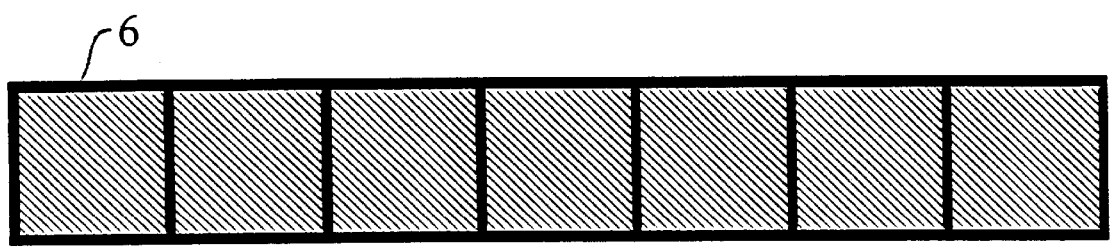
Figure 5:
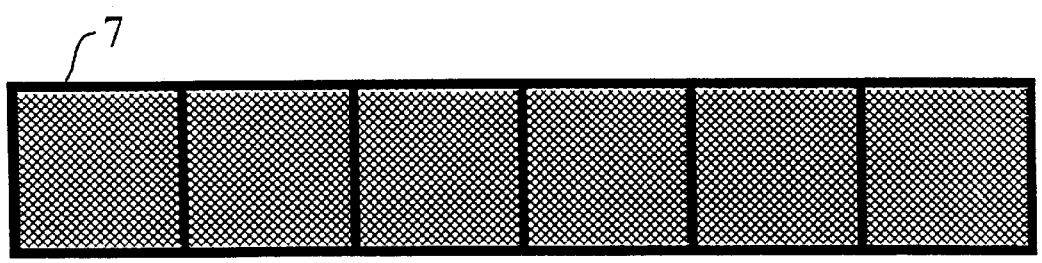
Figure 6:
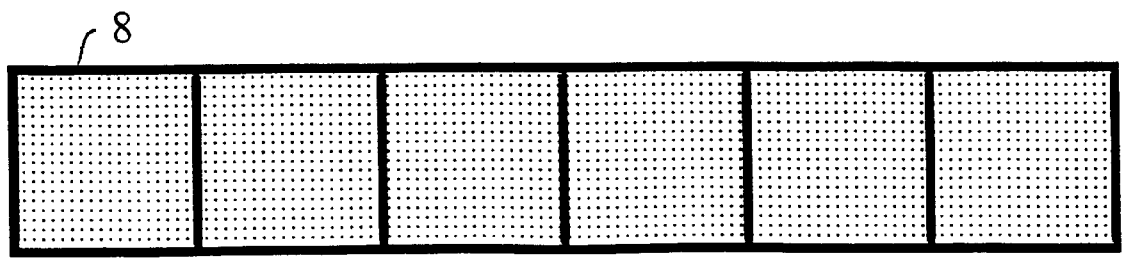

Referring now to FIGS. 3–6, there is shown an example of this process for a four colour pass system such as cyan, magenta, yellow and black. In FIG. 3, there is shown the dither matrix for a first colour (say cyan), with the dither matrix shown as being tiled in the horizontal direction. FIG. 4 shows a dither matrix 6, which is used in the next colour pass (say magenta) and whose size is slightly larger than the dither matrix 5 of FIG. 3. Dither matrix 6 is also shown tiled in the horizontal direction. FIG. 5 shows a third dither matrix 7, utilised in the next colour pass (say yellow), and which is slightly larger than both the dither matrix 5 of FIG. 3 and the dither matrix 6 of FIG. 4. This matrix 7 is also shown tiled in the horizontal direction. FIG. 6 shows a fourth dither matrix 8, again tiled in the horizontal direction but which is slightly larger than the previous dither matrices 5–7.

By using dither matrices of different sizes for each colour pass, the combined luminosity of any particular part of the image will be altered as a result of the changing relationship between different portions of the dither output image.

The term "relatively prime", as used herein, means that given the width of each dither matrix is equal to $w_i$ where i ranges over the number of individual passes, and each $w_i$ can be factored into prime factors $f_l$ to $f_{n(i)}$, then each prime factor is unique and is not repeated over the range $w_i$'s (ie. the widths and heights have no common factors).

Similarly, it is desirable that the height of each dither matrix also forms a relatively prime relationship. By ensuring that the heights and widths of the dither matrices each have a relatively prime relationship, the occurrence of dither matrix repetition will be substantially reduced. Unfortunately, it is sometimes the case that other restrictions placed upon the process of creation of the dither matrices, such as restrictions due to problems of dot gain, restrict the range of possible dither size choices.

The actual dither matrix values can be created utilizing a number of techniques, for example, where a disperse dot dithering system is required, the well known Bayer's technique for disperse dot dither matrices can be used. For an outline of the Bayer technique, reference is made to "Computer Graphics—Principles and Practice", by Foley et al. published 1990 by Addison-Wesley Publishing Company Inc. Reading, Mass.

For an example of a cluster dot dither technique of creating dither matrices, reference is made to the present applicants co-pending PCT patent application entitled "Method for the Creation of Dither Matrices" which claims priority from Australian Provisional Patent Application No. PM1944 of 21 Oct., 1993, filed by the present applicant simultaneously herewith and the disclosure of which is hereby incorporated by cross reference.

In the above referenced patent specification, the dither matrix created can have a particular restriction placed on it, for example the area of the dither matrix being a multiple of 9. However, subject to such restrictions, it is possible to choose the width and height of the dither matrices so as to ensure as low an occurrence of repetition as possible.

By way of example, consider dither matrices having the following sizes:

TABLE 1

| Colour | Size of Dither Matrices | |
|---|---|---|
| | Width | Height |
| cyan | 174 | 174 |
| magenta | 171 | 171 |
| yellow | 165 | 165 |
| black | 177 | 177 |

The dither values of each dither matrix were created in accordance with the above mentioned cross-referenced PCT patent specification.

When the resulting dither matrices were used to individually render a greyscale image, some residual repetitive patterns due to tiling were noticeable to the eye. These patterns or artifacts were thought to be as a result of a repeating dither matrix pattern.

However, when the images were used to render a full colour CYMK image, it was found that the occurrence of patterns or artifacts was substantially reduced, if not eliminated, partially as a consequence of using the variable sized dither matrices. Furthermore, the occurrences of Rosettes or Moire effects also appeared to be reduced.

The foregoing describes only the preferred embodiment of the present invention with minor variations also disclosed. Modifications, obvious to those skilled in the art, can be made thereto without departing from the scope of the invention.

We claim:

1. A method of producing a multicoloured image, wherein said image is produced through an aggregation of a multiplicity of colour dithering passes, said method comprising using a dither matrix for at least one of said passes which is of a different size from a dither matrix used for each remaining pass, said different size being relatively prime in relation to matrices used for each other pass.

2. A method of producing a multicoloured image as claimed in claim 1 wherein each of said passes uses a dither matrix of a different size, at least one of which passes uses a dither matrix whose size is relatively prime in relation to matrices used for each other pass.

3. A method of producing a multicoloured image as claimed in claim 2 wherein widths of said different sized dither matrices are all relatively prime.

4. A method of producing a multicoloured image as claimed in claim 2 wherein heights of said dither matrices are all relatively prime.

5. A method of producing a multicoloured image as claimed in claim 2 wherein widths of said dither matrices are all relatively prime and heights of said dither matrices are all relatively prime.

6. An image produced in accordance with the method of any one of claims 1 to 5.

* * * * *

UNITED STATES PATENT AND TRADEMARK OFFICE
CERTIFICATE OF CORRECTION

PATENT NO. : 5,832,185

DATED : November 3, 1998

INVENTOR(S) : WILLIAM CLARK NAYLOR, JR. ET AL.

It is certified that error appears in the above-identified patent and that said Letters Patent is hereby corrected as shown below:

Title page, item
[75] Inventor's address should read --

"Austria" should read --Australia--.

[73] Assignee's address should read --

"Austria" should read --Australia--.

COLUMN 2

Line 54, "which shows" should read --show--.

Signed and Sealed this

Twenty-fourth Day of August, 1999

Attest:

Q. TODD DICKINSON

Attesting Officer     Acting Commissioner of Patents and Trademarks